United States Patent
Sørensen

(10) Patent No.: US 7,088,236 B2
(45) Date of Patent: Aug. 8, 2006

(54) METHOD OF AND A SYSTEM FOR SURVEILLANCE OF AN ENVIRONMENT UTILISING ELECTROMAGNETIC WAVES

(75) Inventor: John Erik Aasted Sørensen, Virum (DK)

(73) Assignee: IT University of Copenhagen, Copenhagen (DK)

( * ) Notice: Subject to any disclaimer, the term of this patent is extended or adjusted under 35 U.S.C. 154(b) by 95 days.

(21) Appl. No.: 10/602,921

(22) Filed: Jun. 25, 2003

(65) Prior Publication Data

US 2004/0080415 A1    Apr. 29, 2004

Related U.S. Application Data

(60) Provisional application No. 60/391,240, filed on Jun. 26, 2002.

(30) Foreign Application Priority Data

Jun. 26, 2002    (DK) ................ 2002-00997

(51) Int. Cl.
*G08B 1/08* (2006.01)
(52) U.S. Cl. ............. 340/539.13; 340/541; 73/627
(58) Field of Classification Search .......... 340/539.13, 340/426.1, 540, 541, 539.1, 545.1, 545.3, 340/552; 73/627, 628
See application file for complete search history.

(56) References Cited

U.S. PATENT DOCUMENTS

| | | | |
|---|---|---|---|
| 4,155,078 A * | 5/1979 | Bowling et al. ............. 340/561 |
| 4,476,459 A | 10/1984 | Cooper et al. ............. 340/572 |
| 4,684,929 A * | 8/1987 | Edwards et al. ............. 340/541 |
| 4,929,925 A * | 5/1990 | Bodine et al. .......... 340/426.25 |
| 5,907,281 A | 5/1999 | Miller et al. ............. 340/573.6 |
| 5,973,996 A | 10/1999 | Zhevelev et al. ............. 367/99 |
| 6,288,640 B1 * | 9/2001 | Gagnon .................. 340/539.17 |
| 6,307,475 B1 * | 10/2001 | Kelley ...................... 340/573.1 |
| 6,457,364 B1 * | 10/2002 | Howell ........................ 73/602 |
| 2001/0013833 A1 * | 8/2001 | Chen et al. ............ 340/825.22 |
| 2002/0113696 A1 * | 8/2002 | Nilsson et al. .............. 340/541 |

FOREIGN PATENT DOCUMENTS

| | | |
|---|---|---|
| DE | 195 21 511 | 2/1997 |
| EP | 0630118 A1 | 12/1994 |

(Continued)

OTHER PUBLICATIONS

Kara, et al., "Blockage/Shadowing and Polarization Measurements at 2.45 GHz for Interference Evaluation between Bluetooth and IEEE 802.11 WLAN", IEEE Antennas and Propagation Society International Symposium, 2001 Digest, pp. 376-379, vol. 3, ISBN: 0780370708.

(Continued)

*Primary Examiner*—Phung T. Nguyen
(74) *Attorney, Agent, or Firm*—Harness, Dickey & Pierce, P.L.C.

(57) ABSTRACT

A system and method for surveillance of a physical environment. May utilise already installed equipment, such as WLAN for surveillance purposes. This makes the system cost effective to implement. Transmits a first and a second signal. The signals are received by receivers, and the received signals are compared in order to detect a difference in the signals, the difference being caused by a physical change present in the signal path between transmitter(s) and receiver(s). Does not require high spectral purity of the transmitted signals or heavy computations in order to establish that a change has occurred. Suitable for intruder alarm purposes.

32 Claims, 2 Drawing Sheets

FOREIGN PATENT DOCUMENTS

| | | |
|---|---|---|
| EP | 0743540 A2 | 11/1996 |
| EP | 0865012 | 9/1998 |
| GB | 2 350 898 | 12/2000 |
| WO | WO 00/60867 | 10/2000 |

OTHER PUBLICATIONS

Bahl et al., "Enhancements to the RADAR User Location and Tracking System", Microsoft Research, One Microsoft Way, Redmon, WA 98052, USA, Technical Report MSR-TR-2000-12.

"Information Technology—Telecommunications and information exchange between systems—Local and metropolitan area netowrks—Specific requirements—Part II: Wireless LAN Medium Access Control (MAC) and Physical Layer (PHY) Specifications", Approved Jun. 26, 1997, IEEE Standards Board. IEEE Std 802-11-1997.

* cited by examiner

METHOD OF AND A SYSTEM FOR SURVEILLANCE OF AN ENVIRONMENT UTILISING ELECTROMAGNETIC WAVES

This application claims benefit of 60/391,240, filed Jun. 26, 2002.

FIELD OF THE INVENTION

The present invention relates to a method of and system for surveillance of a physical environment. More particularly, the present invention relates to a method of and system for surveillance of a physical environment using electromagnetic waves. The physical environment considered is typically around and inside buildings, open places, open air areas and the like, but might also be concentrated local volumes, e.g. a part of an indoor room. The environment is typically composed of electrically conducting and non-conducting solid construction materials, e.g. iron reinforced concrete and wood, and biological construction materials which constitutes e.g. human beings, animals, trees, but it might also be empty. Furthermore, the physical environment may contain materials in a liquid state, e.g. water. A general concept of preferred embodiments of the present invention relates to surveillance of a physical environment by measuring changes in the propagation properties of electromagnetic waves through the environment.

BACKGROUND OF THE INVENTION

U.S. Pat. No. 4,476,459 discloses a system comprising a transmitter antenna and a receiver antenna mounted within an interrogation zone, formed by the space around the said transmitter and receiver antennas. This transmitter, receiver system is used for detecting the passage of a resonant circuit, through the interrogation zone, by using the following function sequence:
1. The transmitter delivers a short electromagnetic pulse to the interrogation zone.
2. If a resonant circuit is present in the interrogation zone, it receives an electromagnetic energy pulse from the transmitter.
3. Having received the said electromagnetic energy pulse, the resonant circuit resonate at its resonance frequency and thereby transmits energy to the interrogation zone receiver antenna. The signal transmitted from the resonant circuit is decaying in time, and this time decay is used in the receiver for detecting the presence of a resonant circuit, and reduce the number of erroneous detections, which might originate in the electromagnetic noise from the environment.

EP 0 743 540 A2 discloses a system being adapted to detect the presence of foreign objects inside a robbery-prevention security antechamber, e.g. commonly used in banks. The antechamber consists of a plurality of radiofrequency emitting elements, associated with a plurality of receiving units. The six walls of the antechamber are preferably made from electrically conducting materials, which can reflect microwaves in the range of 10 GHz. The antechamber is considered as a resonant cavity, where the distribution of the electromagnetic field depends on the geometric dimensions of the cavity (the antechamber) and the materials in the cavity. A modification of the situation in the antechamber, e.g. by the passage of a person, will change the distribution of the standing wave electromagnetic field. The modification can be detected by analyzing the standing wave electromagnetic field before passage of a person and compare it to the field after passage of a person. The transmitters and receivers are positioned in a two dimensional grid in alternating grid points in the ceiling. An important feature of the transmitters is that they have a sufficient spectral purity, to obtain stable standing wave analysis. The measurement of the standing wave field in the antechamber is carried out by enabling the transmitters one-by-one, and carry out a simultaneous recording of the field using all receivers. These measurements are then compared to what is obtained when a person passes the chamber using the same said measuring procedure, and thereby a detection of a foreign object in the antechamber is obtained.

U.S. Pat. No. 6,288,640 B1 discloses a system comprising a plurality of sensors and a corresponding plurality of receivers. The sensors receive an FM signal broadcast by a transmitter, preferably a commercial FM radio station. Each receiver receives, via the associated sensor, radio frequency signals comprising a multiplicity of transmissions at different frequencies, within a predefined frequency spectrum. The receiver detects the radio frequency signals and computes, for each of a plurality of successive time intervals and for each of the transmission frequencies, a measurement of the signal amplitude over the time interval, compares the signal amplitude measurement with at least one threshold and, if the threshold is exceeded, generates a potential alarm signal. An alarm signal might be generated if a preset number of a multiplicity of the transmission frequencies have detected an alarm. No comparison between two independently transmitted and received signals is performed.

SUMMARY OF THE INVENTION

It is an object of the present invention to provide a surveillance system which is simple to implement and use.

It is a further object of the present invention to provide a surveillance system which is capable of utilising installations which are already present for other purposes.

It is an even further object of the present invention to provide a surveillance system which does not require high spectral purity of the transmitted signals.

It is an even further object of the present invention to provide a surveillance system which is dynamical in use.

It is an even further object of the present invention to provide a surveillance system which does not require heavy computations in order to determine whether a change has occurred.

It is an even further object of the present invention to provide a surveillance method using a surveillance system having the advantages outlined above.

According to a first aspect of the present invention the above and other objects are fulfilled by providing a surveillance system comprising at least one transmitter, each being adapted to transmit a signal, and at least one receiver, each being adapted to receive a signal, said system being further adapted to:
  transmit a first signal by use of one of the at least one transmitters,
  transmit a second signal, succeeding the first signal, by use of one of the at least one transmitters,
  receive said first signal by use of one of the at least one receivers,
  receive said second signal by use of one of the at least one receivers, the system further comprising means for comparing the received first signal and the received second signal in order to detect a difference, if present, in said two signals, said difference being caused by a physical change present in the signal path between at least one of the transmitting transmitters and at least one of the receiving receivers, said change occurring between initiation of transmittal of the first signal and termination of the receipt of the second signal.

According to a second aspect of the present invention the above and other objects are fulfilled by providing a surveillance method, the method utilising at least one transmitter, each being adapted to transmit a signal, and at least one receiver, each being adapted to receive a signal, the method comprising the steps of:

transmitting a first signal by use of one of the at least one transmitters, transmitting a second signal, succeeding the first signal, by use of one of the at least one transmitters, receiving said first signal by use of one of the at least one receivers, receiving said second signal by use of one of the at least one receivers, comparing the received first signal and the received second signal in order to detect a difference, if present, in said two signals, said difference being caused by a physical change present in the signal path between at least one of the transmitting transmitters and at least one of the receiving receivers, said change occurring between initiation of transmittal of the first signal and termination of the receipt of the second signal.

In the present context, the term 'succeeding the first signal' should be understood in such a way that the first transmitted signal and the second transmitted signal are temporally separated in such a way that the first signal is transmitted before the second signal is transmitted.

The physical change is an actual change which has taken place in the physical environment which is subject to the surveillance. It may, e.g., be a person moving through a room, switching on/off of light, heat, air condition, water, etc., opening/closing of a door or a window, and/or any other physical change in the environment. In particular, in case the physical change is a person moving through a room, this may indicate that an intruder has entered the room, and an alarm may therefore be activated. Alternatively, in case light, heat, air condition, water, etc. has been switched on/off, this might indicate a failure in the corresponding system, and a suitable alarm may be activated.

In case a difference is not detected between the two signals, this indicates that no physical change is present. The method steps are then, preferably, repeated until a change is detected and appropriate actions are taken.

The signal path between at least one of the transmitters and at least one of the receivers may be the line of sight, if possible, between said transmitter and said receiver. Alternatively or additionally, the signal path may be a path comprising one or more reflections of the signal and/or one or more refractions of the signal. In any case it is to be understood as the actual path travelled by the signal from the transmitter transmitting the signal to the receiver receiving the signal.

The change should occur between initiation of transmittal of the first signal and termination of the receipt of the second signal, i.e. during the time in which at least one of the signals is under way from a transmitter to a receiver. That is, a physical change may be discovered if it takes place while a 'measurement' is performed.

The first and second signals may be transmitted from the same transmitter. Alternatively, two different transmitters may transmit the first and the second signals.

Similarly, the first and second signals may be received by the same receiver, or by two different receivers.

In one embodiment the first and second signals may be transmitted by the same transmitter, but received by two different receivers. In another embodiment the first and second signals may be transmitted by two different transmitters, but received by the same receiver. Alternatively, the two signals may be transmitted by the same transmitter and received by the same receiver, or they may be transmitted by two different transmitters and received by two different receivers.

The comparing means may be adapted to detect a difference in signal strength between the first received signal and the second received signal. Alternatively or additionally, other signal parameters may be compared, such as frequency, polarization, delay, and/or any other suitable signal parameter.

In one embodiment of the present invention the comparing means may comprise processing means for processing the first and/or the second received signal(s) before comparing them, the comparison being performed on the basis of the processed signals.

In this embodiment the comparison is performed on one or more quantities derived from the signals. Alternatively or additionally, the comparison may be performed on a function of the first and second received signals. Alternatively to this embodiment, the comparison may be performed directly between the two signals in the time domain, or in the frequency domain, e.g. by spectral subtraction, or by similar methods.

The first signal may be transmitted during a pre-selected first time window and the second signal may be transmitted during a pre-selected second time window. The first and second time windows may have equal durations. Alternatively, the durations of the two time windows may be different.

Each of the signals transmitted may be a constant signal, such as a carrier wave or a carrier wave like. Alternatively, they may be known impulses or impulse like signals.

Preferably, the transmitted signals are electromagnetic signals, such as light signals, radio frequency (RF) signals, infrared (IR) signals, etc. Alternatively, the signals may be of any other suitable kind, such as acoustic signals, electrical signals, a beam of particles, or any other suitable kind of signal.

The first and the second signals may be transmitted as a first and a second set of packets of electromagnetic radiation, in which case the receiver(s) receive the first and second sets of packets. In the present context the term 'packet' is to be understood as an indivisible unit of information transfer between transmitter and receiver.

The comparing means may be adapted to compare the statistics on the signal strength of each packet to identify differences between the energy contents of the first and the second set of packets. Alternatively or additionally, other signal parameters of the packets may be compared, such as spectrum, polarization and/or delay.

In a preferred embodiment, the transmitter(s) and the receiver(s) may be components of a wireless network used for data transmission and/or positioning, such as a wireless local area network (WLAN) used for data transmission and/or positioning. In this embodiment a wireless network which is already installed in a specific area for the purpose of providing wireless data transmission possibilities, may be used for surveillance purposes. This is a great advantage, because the surveillance system in this embodiment does not require separate installations. It is therefore very easy and very cost effective to provide a surveillance system according to this embodiment.

In one embodiment at least one transmitter and at least one receiver may be combined into a transceiver. All the transmitters/receivers of the system may pair-wise be combined into transceivers, in which case all 'units' of the system may function as a transmitter as well as a receiver. This embodiment provides a system of great flexibility.

The comparing means may be adapted to compare the detected difference to at least one known value, so as to identify the physical change causing the difference. In this embodiment the known value(s) may represent various known physical changes. The physical changes may previously have been 'detected' under controlled circumstances in order to establish a 'reference' or a number of 'references'. When the surveillance system is operating, it is thus possible to compare the obtained results with this/these reference(s). In case the obtained results match the reference/one of the references, the nature of the physical change may, thus, be determined. Thus, in case it is determined that the physical change is due to a person moving through the room, an intruder alarm may be activated, while the intruder alarm is not activated in case it is determined that the physical change is due to a heater being turned on or off.

The system may further comprise means for collecting and storing previously obtained information relating to a plurality of compared signals, and means for comparing said information in order to allow for evaluation of a temporal development of the obtained information. In this embodiment a long term surveillance of the volume of interest is provided for. When information relating to the compared signals are stored, it is possible to monitor how the signals develop over time. This may, e.g., be used for adjusting a 'reference' as described above, or may be used for detecting changes in the volume, e.g. a gradual change of water contents.

The system may further comprise means for determining the position of physical changes in the volume of interest. In this embodiment it is not just detected that a physical change has occurred, but also the position in which this change has occurred. This may be important in order to determine which actions to perform in case a physical change is detected. In this embodiment it is necessary to have a physical model of the volume of interest. The 'position information' (e.g. originating from transmitted/received signals which have been reflected, refracted or damped by an object which has entered the volume of interest) may then be combined with the physical model in order to establish the position of the physical change.

BRIEF DESCRIPTION OF THE DRAWINGS

The present invention, and in particular preferred embodiments thereof, will now be presented in connection with the accompanying drawing, in which.

DETAILED DESCRIPTION OF THE DRAWINGS

Figure 1:
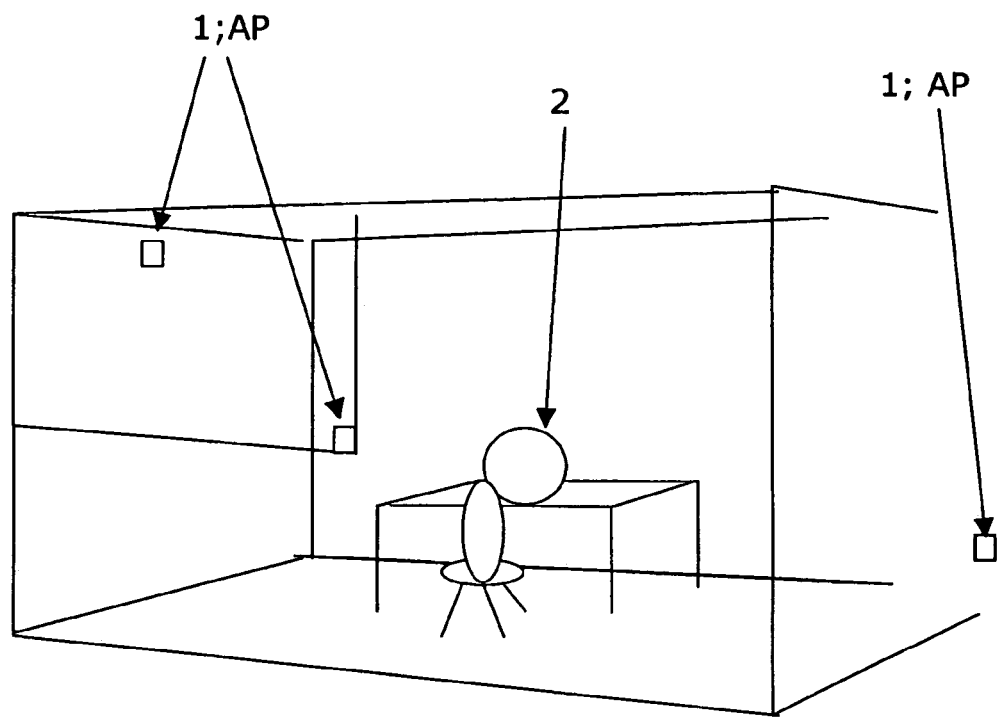
FIG. 1 shows an environment according to a preferred embodiment of the present invention, the environment comprising a room with four walls, a floor and a ceiling.

An overall concept of preferred embodiments according to the present invention is indicated in FIG. 1 which shows a room being configured with a wireless local area network (WLAN) having transceivers, i.e. a device comprising a transmitter (TX) for transmitting and receiver (RX) for receiving electromagnetic radiation. The transceivers 1 constitute access points (AP) in the WLAN.

FIG. 1 shows a room with four walls, a floor and a ceiling. Inside the room there is a table, a computer 2 and a chair. Some of the major construction elements of the chair are assumed to be metallic. At the midpoint between the two upper left corners of the room, is positioned a Wireless Local Area Network (WLAN) Access Point (AP) 1. Furthermore, an AP 1 is positioned at the midpoint of the nearest left wall, and in the rightmost corner, a short distance above the floor. The WLAN is designed such that the APs 1 can communicate, and furthermore the computer 2, also denoted a client, can communicate with one or more of the APs 1. It is to be understood that the APs 1 can be placed in many different ways, and the above is an example.

Within the room a computer 2, also denoted a client, is present, which computer 2 comprises a transceiver enabling data communication with a server via the transceivers 1. Furthermore, three transceivers 1 and thereby three access points (AP) are present in the room as shown in FIG. 1.

It is noted that the WLAN is preferably of the known and ordinary type, but it is contemplated that transmitters, receivers of the Bluetooth type or the like technology or transceivers dedicated surveillance purposes may be applied in connection with the present invention.

When the WLAN is used for surveillance in accordance with the present invention, the WLAN is operated in two different modes: Mode 1 and Mode 2.

Initially one of several Mode 1 and Mode 2 regimes is described.

In Mode 1, a set of packets is transmitted from a transceiver 1. The number of packets in the set are preferably transmitted during a time window having a predetermined length, $T_1$ seconds. It is contemplated that the packets contain information on the transmitted signal parameters (e.g. signal strength, polarization, spectrum, etc.). Upon receipt of the packets by the transceiver 1, the strength, and/or other signal parameters, of each packet is detected, recorded and stored, possibly together with the information on the signal strength, or the signal parameters, by which each packet was transmitted, thereby establishing a Mode 1 vector comprising, for each package in the set, the transmitted and the received signal strengths or the signal parameters. Thus the Mode 1 establishes a reference model. Following this Mode 1, which may be characterised as determining a reference for comparison, Mode 2 is carried out. Basically the same steps as performed in Mode 1 are carried out, i.e. transmitting a set of packets and receiving, detecting and recording the strengths, or the signal parameters, whereby a Mode 2 vector is established comprising, for each packet in the set, the transmitted strength, and/or other signal parameters and the received strength, or the signal parameters. Thus the Mode 2 establishes the current model.

The Mode 1 and Mode 2 might be defined within a selection of regimes defined by the movement of Mode 1 and Mode 2 time windows. In the following are given three examples of regimes, but many alternative regimes are possible.

Assume the following:
- n: A counter assuming the values n=0,1,2, . . . For each increment of n, a test is carried out between the reference model and the current model, to detect if en event has happened.
- M1: The number of packets transmitted in the Mode 1 window.
- M2: The number of packets transmitted in the Mode 2 window.
- m1(n): The highest packet number in the Mode 1 window, with counter n.
- m2(n): The highest packet number in the Mode 2 window, with counter n.
- dm1: The number of packets the Mode 1 window is moved, when incrementing n by 1.
- dm2: The number of packets, the Mode 2 window is moved, when incrementing n by 1.

Then the time instances $t_n$ of the Mode 1 and Mode 2 windows packets, are determined as follows:

Initialize: m1(−1)=M1 and m2(−1)=M1+M2.

Begin for n=0,1,2, . . . Counter for comparing the reference model and the current model.

m1(n)=m1(n−1)+dm1×n

The time instances of the Mode 1 window packets, used in the Mode 1 model, are:

$t_{m1-M1+1} < \ldots < t_{m1}$ m2(n)=m2(n−1)+dm2×n

The time instances of the Mode 2 window packets, used in the Mode 2 model, are:

$T_{m2-M2+1} < \ldots < t_{m2}$

Endfor n

Then the following regimes are obtained, by selecting the corresponding parameter values.

A fixed Mode 1 window and block movement of the Mode 2 window is obtained by:
M1>0, M2>0, dm1=0, dm2=M2.

A block movement of the Mode 1 window and block movement of the Mode 2 window is obtained by:
M1>0, M2>0, dm1=M1, dm2=M2.

A sliding movement of the Mode 1 window and single packet movement of the Mode 2 window is obtained by: M1>0, M2=1, dm1=1, dm2=1. The Mode 2 window consists of just one packet.

It is noted, that in a WLAN operated to continuously transmit packets, the sets considered above may be defined by only recording information on the strengths, and/or the other signal parameters in the given time windows.

The information contained in the Mode 1 and Mode 2 vectors is now analysed to identify any significant difference between them. If a significant difference is identified, this is an indication that an event influencing the transmission of electromagnetic-radiation occurred after Mode 1 was initiated and before Mode 2 was completed.

Another advantageous effect of the present invention may be obtained by tuning the system to identify specific events. This is done by analysing the effect a known event has on the Mode 2 vector and storing this information for later on the fly comparison for identification. Furthermore, one could easily consider to embody the system in a manner where the Mode 1 vector is obtained in advance and under predetermined known conditions whereby any difference to such known conditions would be reflected in the Mode 2 vector. Furthermore, there is referred to the selection of the regimes of Mode 1 and Mode 2 windows.

Furthermore, the invention may also be embodied as a system utilising detection of changes in a carrier wave like signal, that is transmission of a continuous wave by one of the transmitters. Alternatively the invention may also be embodied as a system utilizing detection of changes in the transmission of short time impulses. In such systems, the receiver detects, in Mode 1, the signal in a first time window and performs for instance an integration over time of the received signal or estimated signal parameter properties (e.g. signal strength, polarization, spectrum, etc.). In Mode 2, the same procedure is applied and the signal is integrated or the signal parameter properties (e.g. signal strength, polarization, spectrum, etc.) are estimated. The two integrated signals or the signal parameter properties are then compared to each other and if a difference is found, an indication of a change in the volume of interest is detected. The transceivers 1 are connected via wires to a server. Alternatively they might connect wirelessly to the server. The purpose of the server is to control the transceivers 1 and to perform the data-processing. The data-processing comprises outputting to the transceivers 1 information on which signal to be transmitted and perform the comparison of the signals received, from transceivers 1 which are access points or transceiver 2 which is a client, during Mode 1 and Mode 2. It should, however, by noted that the data-processing may be made an integral part of the functioning of the transceivers 1 and 2.

Considering the above, the invention may in general be seen to be represented by the following items:

A 3D physical environment of interest which in the following is denoted Volume of Interest (VOI). The physical material in VOI, if any, is represented by the spatial position dependence of the constitutive relations of the Maxwell equations, where the physical material is characterized by the material parameters permittivity $\epsilon$, permeability $\mu$ and conductivity $\sigma$. One such example may be: The VOI can be the interior of a house, including the nearest outdoor environment of the house.

An event within the VOI is characterised by a change in one or more of the physical material parameters, within a finite time window. This means that $\epsilon=\epsilon$(spatial position, time), $\mu=\mu$(spatial position, time) and $\sigma=\sigma$(spatial position, time), where the spatial position is within the VOI. One such example may be: A person moves from one room in a house to another, by walking through the former room then opening a door and walking into the latter room and finally closing the door.

The position of an event is the spatial position of the changed material parameters within the VOI. Examples may be: The instantaneous spatial position of a person, walking around in a house or the position of a door being opened.

The surveillance or detection system components are denoted GE, TM, TX, RX and DT where:
- GE is a generator which delivers data sequences, to be transmitted by the electromagnetic wave transmitter TX.
- TM is the transmission mode: Either through an electromagnetic carrier frequency or electromagnetic impulses.
- TX is an electromagnetic wave transmitter, working either at a carrier frequency f or by transmitting impulses. The transmitter is equipped with an antenna.
- RX is an electromagnetic wave receiver, receiving at the carrier frequency f or wide band if electromagnetic impulses are used. The receiver is equipped with an antenna.
- DT is a data sequence detector connected with RX. DT works in two modes. In Mode 1, a reference model estimated from the received signal strength or the said signal parameters at the carrier frequency or the received impulses of the propagation paths from TX to RX, is estimated. In Mode 2 it is tested, if the current signal strengths or the signal parameters received through the propagation paths, the current model, deviate from the reference model estimated in Mode 1. These models are based on methods available within the area of signal processing and statistics.

Furthermore, the combination of GE and DT can work in four different function cases, denoted GE_DT_1 to GE_DT_4. They represents four different combinations of data communication and/or surveillance systems. The four cases are determined by the capabilities of the GE, having completely control of the communication mode and the data sequence (DS) transmitted or not; and the capability of DT to carry out feed-back to GE, dependent on the received DS, and its associated parameters, e.g. strength, polarization, spectrum.

This leads to the following:

GE_DT_1: GE does not have completely control of the DS. DT does not have feed-back capability to GE, dependent on the received DS. This system carries out a combination of data communication and surveillance, without the option of adapting the surveillance function dependent on the result of the surveillance.

GE_DT_2: GE does have completely control of the DS. DT does not have feed-back capability to GE, dependent on the received DS. This system has the option of dividing the communication resources among data communication and surveillance, without the option of adapting the surveillance function dependent on the result of the surveillance.

GE_DT_3: GE does not have completely control of the DS. DT does have feed-back capability to GE, dependent on the received DS. This system carries out a combination of data communication and surveillance, with the option of adapting a part of the communication resources to surveillance, e.g. dependent on the result of the surveillance.

GE_DT_4: GE does have completely control of the DS. DT does have feed-back capability to GE, dependent on the received DS. This system has the option of dividing the data communication into use for communication and surveillance, with the option of adapting the communication capacity, e.g. depending on the result of the surveillance. Thus this system can change function mode from a situation where nearly all the communication capacity is used for data communication into a situation where all the capacity is allocated for surveillance.

Thus, a surveillance system may preferably comprise a volume of interest (VOI), in which a transmitter (TX) and a receiver (RX) are mounted in known spatial positions. One example of the operation of the surveillance system for event detection is as follows: In Mode 1, the detector DT estimates, through the time period $T_{start}$ to $T_{stop}=T_{start}+T_1$, the received signal parameter statistics of the GE data sequence, e.g. signal strength, polarization, spectrum, etc., transmitted from TX to RX via electromagnetic wave propagation paths. Then at time $T_{stop}$ the detector is switched from Mode 1 to Mode 2, where deviation of the received signal statistics from that, estimated in Mode 1 is tested. If a deviation is found, then an event is detected within the VOI.

A surveillance system is thus, preferably, represented by the quintuple {GE,TM,TX,RX,DT}, where the said components are defined above.

The propagation paths from TX to RX comprises two parts: The line of sight (LOS) propagation path, which is the shortest straight line path from TX to RX and the multipath (MP) propagation from TX to RX, where the electromagnetic waves have been reflected or refracted at least one time. It is noted that a design principle for TX, RX pairs, targeted for combining data communication and VOI surveillance, might be based on a principle of minimizing the influence of multipath for the communication part and maximizing the influence of multipath for the VOI surveillance part.

A complete surveillance or detection system is then a covering of the volume of interest with a set of surveillance systems {GE,TM,TX,RX,DT} with known positions. They are in the following represented by {$GE_{i,j}$,$TM_{j,k}$,$TX_j$,$RX_k$, $DT_{m,k}$} where:

i=1,2, . . . , $NG_j$ (the number of generators of transmitter j)

j=1,2, . . . , NT (the number of transmitters)

k=1,2, . . . , NR (the number of receivers)

m=1,2, . . . $ND_k$ (the number of detectors of receiver k).

It is noted that each transmitter might have several generators; that the transmission mode might be dependent on the specific TX RX pair, and thus spatial dependent and that each receiver might have several detectors.

In the case where the transmission mode is based on a carrier frequency, the electromagnetic wave carrier frequency of TX is selected as a compromise between frequencies, which are sensitive to an event and frequencies which are technologically feasible. To obtain a shadow effect of a human being, also denoted a fade in the transmission from TX to RX, it is desirable with a carrier frequency not smaller than 1 GHz. Frequencies lower than 400 MHz mainly pass through the human body and frequencies higher than 3 GHz are completely reflected by the human body.

Any transmitter, receiver pair, where the receiver can determine the received signal strength of a known transmitted signal sequence with known strength, can embody the surveillance system.

An example of a preferred embodiment of a surveillance system according to the present invention utilises a Wireless Local Area Network (WLAN), exemplified by [IEEE 802.11, 1997]. In the following, the definitions related to WLAN are based on that standard.

The embodiment of the surveillance or detection system utilises the following WLAN elements:

Access Point (AP) [IEEE 802.11, 1997] p. 3, comprising a transmitter AP-TX part and a receiver AP-TX part.

Channel (CH) [IEEE 802.11, 1997] p. 3.

RXVECTOR parameters [IEEE 802.11, 1997] p. 181, with Received Signal Strength Indicator (RSSI), which is an optional parameter that has a value of 0-$RSSI_{max}$. This parameter is a measure by the PHY sublayer, of the energy observed at the antenna used to receive the current PPDU. The RSSI is measured between the beginning of the start frame delimiter (SFD) and the end of the PLCP header error check (HEC). Thus the energy measurement of RSSI is according to [IEEE 802.11, 1997] p. 183, FIG. 70, and is defined by the SFD (16 bit)+PLW (12 bit)+PSF (4 bit)+HEC (16 bit), in total 48 bit.

A surveillance or detection system is embodied as follows:

GE≡Data sequence generator of PPDU, embodied in the computer associated with $AP_1$-TX.

TX≡$AP_1$-TX, mounted in a fixed, known position in VOI.

RX≡$AP_2$-RX, mounted in a fixed, known position in VOI or RX≡Client–RX mounted in a fixed, known position.

DT≡Detection algorithm embodied in the computer associated with the client. $S_1(t_n)$≡Value of RSSI at time $t_n$.

The DT-algorithm performs the following steps, in the GE_DT_1 function case:

Mode 1: Acquisition of $\{S_1(t_n)\}$ during the time window $T_{start}$ to $T_{start}+T_1$, and switch at time $T_{start}+T_1$ into Mode 2.

Mode 2: Repeat

Acquisition of $\{s_s(t_n)\}$ during the time window $T+T_1$.

Perform a Kolmogorov-Smirnov statistical test of identity of the empirical distribution function obtained during Mode 2 on $\{s_s(t_n)\}$, with the function obtained during the Mode 1 on $\{S_1(t_n)\}$ using a threshold TH. If the empirical distributions are different according to the said threshold TH then an event is detected.

End Repeat.

It is to be understood that many alternative detection functions and tests can be used.

If the WLAN performs both standard data communication and surveillance, the compound system is denoted a Multimodal WLAN or a Multifunction WLAN. In general a network performing this function will be denoted a Multimodal Network.

An improvement is the application of a Surveillance Anchoring Access Points (SMP), positioned close to the floor in an indoor site and ordinary WLAN APs or fixed mounted WLAN clients placed in the usual positions. APs or fixed mounted WLAN clients might be used for SAAPs thus used solely for surveillance.

Another improvement is to enhance the VOI sensitivity with respect to surveillance, by embedding light metal structures in the construction elements, which might be critical with respect to surveillance, such as doors.

Figure 2:
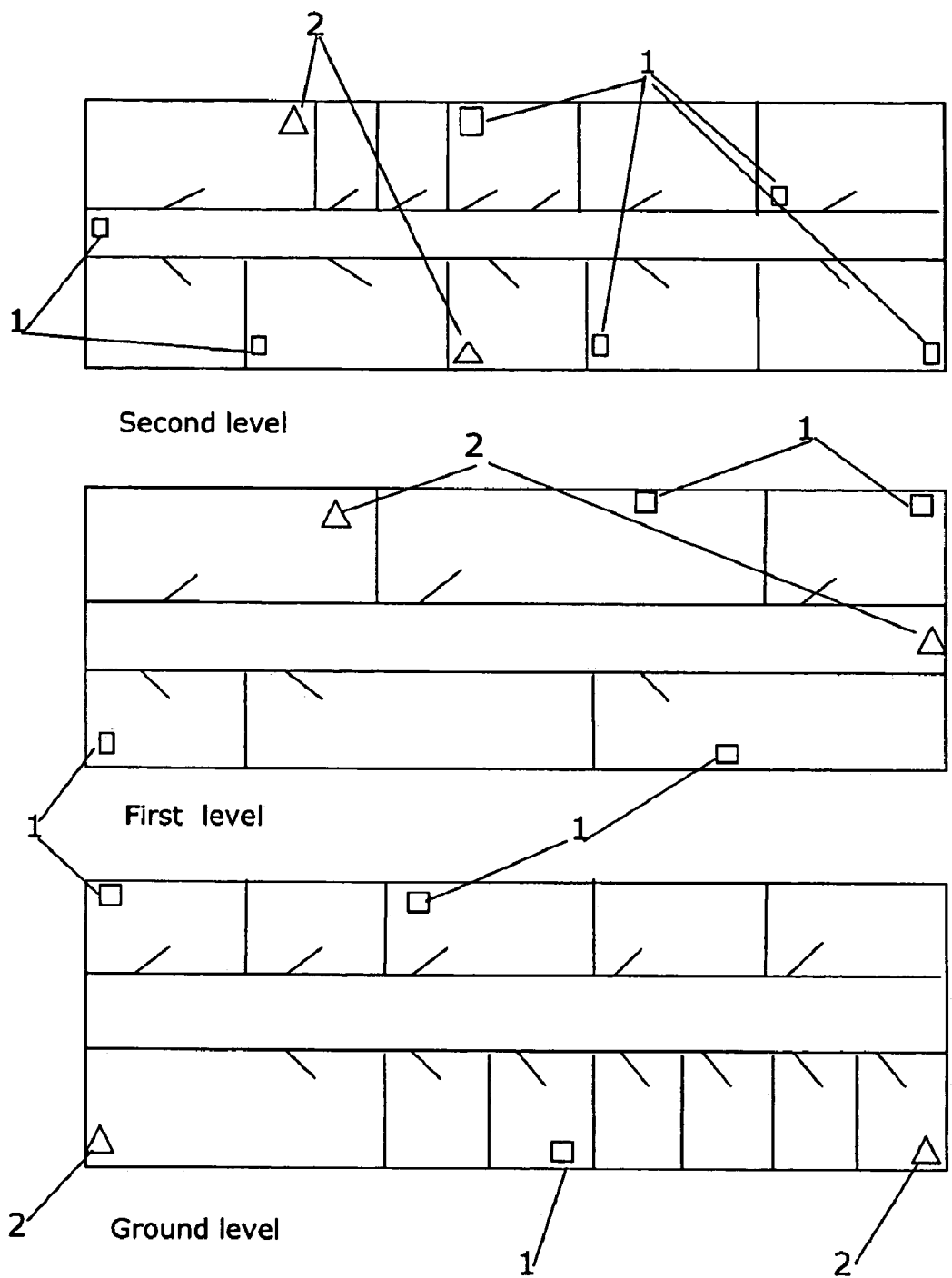
FIG. 2 shows an environment according to another preferred embodiment of the present invention, the environment comprising three levels of a building, a ground level, first level and second level.

FIG. 2 shows an example with three levels of a building, a ground level, first level and second level. The building is in the usual way consisting of rooms, pathways, doors etc. The buildings three levels are covered by a combination of WLAN Access Points (APs) 1 (shown as squares) and WLAN clients 2 (shown as triangles), all mounted in fixed positions in the building. The APs 1 might communicate with each other, and they are preferably connected through a fixed wired network using standard systems. The WLAN clients 2 communicate with those APs 1, which are within the communication range of the clients 2. The surveillance is carried out by detecting changes in the said received signal strengths or signal parameters (e.g. polarization, spectrum) between the clients 2 and APs 1 and between the APs 1. It is noted that AP 1 and clients 2 may communicate across different floors.

Localized Surveillance

It is foreseen that the complete surveillance system may be extended into localized surveillance. The objective of localized surveillance is to combine data communication between transmitter, receiver pairs, with a priori physical model information of the volume of interest (VOI), into a determination of the approximate physical position of reflection changes, if any, for some of the major reflection points in the volume of interest. A change might e.g. be the opening and closing of a door, which contains metallic parts of a size sufficient for detecting its change of position.

It is assumed that the volume of interest (VOI) is covered by the complete surveillance system. It is furthermore assumed that the VOI is represented by a physical model, which describes the geometrical position of the materials within the VOI. If, e.g., the VOI contains a building, then the physical model might be represented by the computer aided information base, which is the blueprint of the building, describing the placement of all construction materials and the type of materials used. This model is in the following referred to as the physical model of the volume of interest. It is also assumed that the transmitters, belonging to the complete surveillance system, transmit a signal, known in advance to the receivers belonging to the complete surveillance system. A receiver can then determine the time instances in the received signal, where the transmitted signal is received along a path containing environment reflector, e.g. by using cross correlation between the known transmitted signal and the received signal. Assuming that the geometrical positions of the transmitters and receivers are known and fixed within the volume of interest, it is possible to compute the transmission delay from any transmitter to any receiver. Furthermore it is assumed that a receiver (RX) receives a signal from a transmitter (TX) along the shortest straight line joining them. This is the so-called line of sight (LOS). The signal received along the LOS, is the first signal received in the receiver. All other signals from the transmitter will arrive later to the receiver. The transmission time for a signal received along one of the paths with reflectors, assuming only one reflection on the path, is determined as the sum of the transmission time along LOS and the time difference between the received path signal and the LOS signal. This latter difference can be determined in the receiver, e.g. using cross correlation. Knowing the transmission time from a transmitter (TX) to a reflector belonging to the volume of interest and further to a receiver (RX), together with the known positions of the TX and RX, characterizes the rotational symmetrical ellipsoid surface on which the reflector is residing, for a given pair of transmitter and receiver. The focus points of the ellipsoid are the positions of the receiver and the transmitter, and the geometrical distance from a focus point to the surface of the rotational symmetrical ellipsoid and further to the other focus point, is the above transmission time from the transmitter to a reflector and further to a receiver multiplied by the speed of light.

Assuming that the volume of interest contains only one reflector, then for each transmitter (TX) and receiver (RX) pair this reflector resides on the rotational symmetrical ellipsoid surface, provided the reflector is within the range of the TX,RX pair. The position of the reflector is then found by solving for the coordinates in the 3D space of the intersections between the ellipsoids obtained from all TX,RX pairs in the VOI.

Now, assuming that the volume of interest contains a composite physical object, e.g. a building, represented by the physical model, then the positions of the major reflectors are determined as follows. It is assumed that all physical objects are stationary, which means that no reflectors are changing position within the volume of interest. Then the positions of the transmitter, receiver pairs, together with the cross correlation of the transmitted and received signals and the physical model of the volume of interest, are used for a combination of combinatorial search and numerical optimization for determining the reflection points positions.

A more detailed description of Localized Surveillance is made in the following.

It is assumed that the volume of interest (VOI) is covered by a complete surveillance system as follows:

Set of transmitters $TX_j$ where $j=1,2,\ldots,N_T$. $N_T$ is the number of transmitters.

Positions of transmitters within the VOI $pt_j=(ptx_j,pty_j,ptz_j)$, where $j=1,2,\ldots,N_T$.

Set of receivers $RX_i$, where $i=1,2,\ldots,N_R$. $N_R$ is the number of receivers.

Positions of receivers within the VOI
$pr_i=(prx_i, pry_i, prz_i)$, where $i=1,2, \ldots, N_R$.
$D_{i,j}$ is the geometrical distance between the receiver $RX_i$ and transmitter $TX_j$, where $i=1,2, \ldots, N_R$ and $j=1,2, \ldots, N_T$.
c is the speed of light in meter/second.
$r_{i,j}(k)$ is the cross correlation between the signal transmitted from transmitter $TX_j$ and the signal received in receiver $RX_i$, where k is the lag of the cross correlation.

The time increment of the cross correlation function, corresponding to an increment of the lag k by 1 corresponds to an increment of T seconds.

The lowest value of $k=k_0$, where $|r_{i,j}(k)|>w_{noise}$ and where $w_{noise}$ is a noise threshold, is the time delay corresponding to receiving the signal along the line of sight (LOS) path from the transmitter ($TX_j$) to the receiver ($RX_i$), assuming that communication along LOS is possible. A value of $k=k_n$ and $k_n>k_0$ where $|r_{i,j}(k_n)|>w_{noise}$ corresponds to one or more multipat propagation delay from the transmitter $TX_j$ to reflector in the VOI and further to the receiver $RX_i$. The geometrical length of this path, $L_{i,j}$, is determined by $L_{i,j}$ (m)=$D_{i,j}$+$cT(k_n-k_O)$=$D_{i,j}$+dm, where d=cT is the spatial resolution of the receiver, and $m=k_n-k_O$.

A path where $|r_{i,j}(k)|>w_{noise}$ is said to belong to a major reflection point.

The rotational symmetrical ellipsoid surface, where a reflector is residing, determined by $TX_j$ and $RX_i$, is denoted $E_{i,j}(x,m)=0$, where x=(x,y,z) is the independent spatial variables of the surface.

Assuming that the volume of interest does only contain 1 reflector, and that there are used $N_T$ transmitters and $N_R$ receivers, then the position of the reflector $r=(r_x, r_y, r_z)$ is found by solving the following nonlinear problem:
$r=\arg(x) \min \Sigma_i \Sigma_j [E_{i,j}(x,m)]^2$, where $i=1,2, \ldots, N_R$ and $j=1,2, \ldots$ m is the cross correlation lag difference corresponding to the path in the respective cross correlation functions.

Now, assuming that the volume of interest contains a composite physical object, e.g. a building, then the determination of the locations of the major reflection points are determined as follows. For each pair of $TX_j$ and $RX_i$, the cross correlation between the received signal and the reference signal is determined as $r_{i,j}(m)$, where m is defined above. Furthermore for each pair of $TX_j$ and $RX_i$, it is possible to determine the positions of the major physical model reflectors of relevance to this pair, because the positions of $TX_j$ and $RX_i$ are known.

A framework for identifying the positions of the major reflection points, is as follows: The positions of the reflectors might be found using a selection of methods. It is suggested to use a combination of combinatorial search on sets of reflections and numerical optimization to find the numerical values of the reflection positions. The search is controlled in combination by the reflections and the physical model of the volume of interest. For a stationary reflecting volume of interest, this solution might then be used repeatedly, for testing deviation from stationarity and the positions within volume of interest, where the deviations happens.

It is to be understood that the cross correlation can be substituted with other methods for time delay estimation.

Long Term Analysis of Volume of Interest

Furthermore it is foreseen to use a complete surveillance system for a volume of interest (VOI) for long term analysis of the VOI, using the fixed Mode 1 window and block movement of the Mode 2 window, under the assumption that the VOI physical model is unchanged.

Using all measurements in the complete surveillance system fixed Mode 1 window in a model A and comparing to all the measurements in the complete surveillance system Mode 2 block moving window in a Model B can be used for detection of major changes in the material of the VOI, by comparing Model A and Model B.

Families of Surveillance Systems

At least four families of surveillance systems are contemplated, which all might be preferably embodied by use of: Custom designed hardware, WLAN, Bluetooth or the like.
  Function: Event detection within the volume of interest (VOI).
  Function: Event detection within the VOI and data communication.
  Function: Event detection including positioning of the event within the VOI.
  Function: Event detection including positioning of the event within the VOI and data communication.

The Terminology Used in Connection with the Present Invention Comprises

| | |
|---|---|
| AP: | Access Point of Wireless Local Area Network. |
| DS: | Data sequence. |
| DT: | Detector. |
| HEC: | Header error check. |
| PLCP: | Physical Layer Convergence Protocol, [IEEE 802.11, 1997] p. 8. |
| PLW: | Length of PSDU. |
| PPDU: | PLCP Protocol Data Unit. |
| PSF: | PLCP Signalling Field. |
| PSDU: | PLCP SDU. |
| RSSI: | Received Signal Strength Index. |
| RX: | Receiver. |
| SAAP: | Surveillance Anchoring Access Point of Wireless Local Area Network. |
| SDU: | Service Data Unit. |
| SFD: | Start frame delimiter. |
| TH: | Threshold in Event Detector. |
| TX: | Transmitter. |
| WLAN: | Wireless Local Area Network. |
| $\epsilon$: | permittivity, |
| $\mu$: | permeability |
| $\sigma$: | conductivity |

The Following References Referenced Herein

[IEEE 802.11, 1997] is IEEE Std. 802.11-1997, Part 11: Wireless LAN Medium Access Control (MAC) and Physical Layer (PHY) Specification.

The invention claimed is:

1. A surveillance system comprising at least one transmitter, each being adapted to transmit an electromagnetic signal, and at least one receiver, each being adapted to receive a signal, said system being further adapted to:
    transmit a first electromagnetic signal by use of one of the at least one transmitters,
    transmit a second electromagnetic signal, succeeding the first signal, by use of one of the at least one transmitters,
    receive said first signal by use of one of the at least one receivers,
    receive said second signal by use of one of the at least one receivers,
    the system further comprising a comparing device that compares the received first signal and the received second signal in order to detect a difference, if present, in said two signals, said difference being caused by a physical change present in the signal path between at least one of the transmitting transmitters and at least one of the receiving receivers, said change occurring between initiation of transmittal of the first signal and termination of the receipt of the second signal, wherein the transmitter(s) and the receiver(s) are components of a wireless network used for data transmission.

2. A surveillance system according to claim 1, wherein the first and second signals are transmitted from the same transmitter.

3. A surveillance system according to claim 1, wherein the first and second signals are received by the same receiver.

4. A surveillance system according to claim 1, wherein the comparing device is adapted to detect a difference in signal strength between the first received signal and the second received signal.

5. A surveillance system according to claim 1, wherein the comparing device comprises a processing device for processing the first and/or the second received signal(s) before comparing them, the comparison being performed on the basis of the processed signals.

6. A surveillance system according to claim 1, wherein the transmitter(s) is/are adapted to transmit the first signal during a pre-selected first time window and to transmit the second signal during a pre-selected second time window.

7. A surveillance system according to claim 1, wherein each of the signals transmitted is a constant signal, including a carrier wave or a carrier wave like signal.

8. A surveillance system according to claim 1, wherein each of the signals transmitted is an impulse, or an impulse like signal.

9. A surveillance system according to claim 1, wherein the transmitter(s) is/are adapted to transmit the first and second signals as a first and second set of packets of electromagnetic radiation, and wherein the receiver(s) is/are adapted to receive the first and second sets of packets.

10. A surveillance system according to claim 9, wherein the comparing device is adapted to compare the statistics on the signal strength of each packet to identify differences between the energy contents of the first and second set of packets.

11. A surveillance system according to claim 9, wherein the comparing device is adapted to compare the signal parameters, including polarization, spectrum and/or delay of each packet, so as to identify differences between the parameters of the first and second set of packets.

12. A surveillance system according to claim 1, wherein the wireless network is a wireless local area network used for data transmission.

13. A surveillance system according to claim 1, wherein at least one transmitter and at least one receiver are combined into a transceiver.

14. A surveillance system according to claim 1, wherein the comparing device is adapted to compare the detected difference to at least one known value, so as to identify the physical change causing the difference.

15. A surveillance system according to claim 1, further comprising a collecting and storing device for collecting and storing previously obtained information relating to a plurality of compared signals, and the comparing device for comparing said information in order to allow for evaluation of a temporal development of the obtained information.

16. A surveillance system according to claim 1, further comprising a device for determining the position of physical changes in the volume of interest.

17. A surveillance method, the method utilizing at least one transmitter, each being adapted to transmit an electromagnetic signal, and at least one receiver, each being adapted to receive a signal, the method comprising the steps of:

transmitting a first electromagnetic signal by use of one of the at least one transmitters, transmitting a second electromagnetic signal, succeeding the first signal, by use of one of the at least one transmitters, receiving said first signal by use of one of the at least one receivers, receiving said second signal by use of one of the at least one receivers, comparing the received first signal and the received second signal in order to detect a difference, if present, in said two signals, said difference being caused by a physical change present in the signal path between at least one of the transmitting transmitters and at least one of the receiving receivers, said change occurring between initiation of transmittal of the first signal and termination of the receipt of the second signal, wherein the transmitter(s) and the receiver(s) are components of a wireless network used for data transmission.

18. A method according to claim 17, wherein the first and second signals are transmitted from the same transmitter.

19. A method according to claim 17, wherein the first and second signals are received by the same receiver.

20. A method according to claim 17, wherein the comparing step comprises detecting a difference in signal strength between the first received signal and the second received signal.

21. A method according to claim 17, wherein the comparing step comprises processing the first and/or second received signal(s) before comparing them, the comparison being performed on the basis of the processed signals.

22. A method according to claim 17, wherein the first signal is transmitted during a pre-selected first time window and the second signal is transmitted during a pre-selected second time window, said first and second time windows preferably having equal duration.

23. A method according to claim 17, wherein each of the signals transmitted is a constant signal, including a carrier wave or a carrier wave like signal.

24. A method according to claim 17, wherein each of the signals transmitted is an impulse, or an impulse like signal.

25. A method according to claim 17, wherein the steps of transmitting a first and a second signal are performed by transmitting a first and a second set of packets of electromagnetic radiation, and wherein steps of receiving the first and second signals are performed by receiving the first and second sets of packets.

26. A method according to claim 25, wherein the comparing step comprises comparing the statistics on the signal strength of each packet to identify differences between the energy contents of the first and second set of packets.

27. A method according to claim 25, wherein the comparing step comprises comparing the signal parameters, including polarization, spectrum and/or delay of each packet, so as to identify differences between the parameters of the first and second set of packets.

28. A method according to claim 17, wherein the wireless network is a wireless local area network used for data transmission.

29. A method according to claim 17, wherein the first and second signals are transmitted and received by one or more transceivers.

30. A method according to claim 17, wherein the comparing step comprises comparing the detected difference to at least one known value, so as to identify the physical change causing the difference.

31. A method according to claim 17, further comprising the steps of:

collecting and storing previously obtained information relating to a plurality of compared signals, and comparing said information in order to allow for evaluation of a temporal development of the obtained information.

32. A method according to claim 17, further comprising the step of determining the position of physical changes in the volume of interest.

* * * * *